Nov. 24, 1953          F. JAKOBI          2,659,982
                      CALIPER GAUGE
                    Filed May 26, 1950
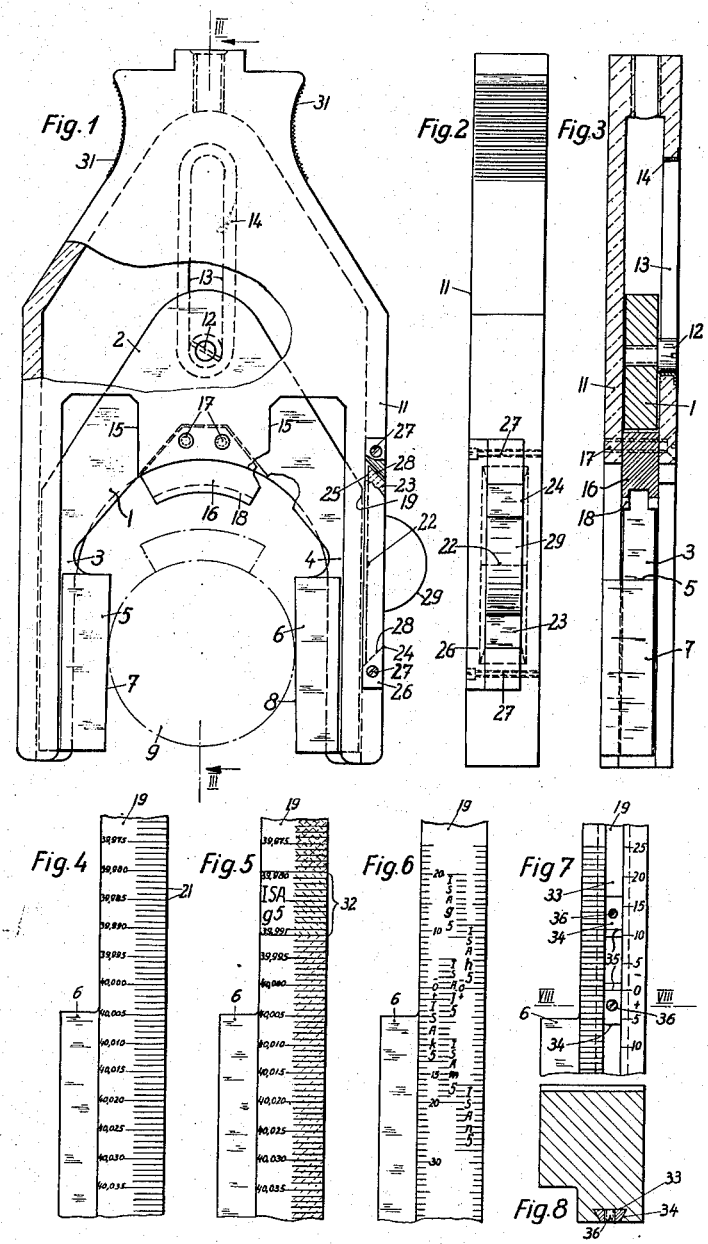
Inventor:
Friedrich Jakobi Patented Nov. 24, 1953

2,659,982

UNITED STATES PATENT OFFICE 2,659,982

CALIPER GAUGE

Friedrich Jakobi, Essen, Germany

Application May 26, 1950, Serial No. 164,390

7 Claims. (Cl. 33—178)

The invention refers to caliper gauges for effecting measurements within the range of allowances of a nominal or specified size in which the two measuring surfaces contact points diametrically opposing one another of the cylindrical body to be tested.

Customarily, caliper gauges of this type are limit caliper gauges equipped with two pairs of measuring surfaces, one of the pairs representing the upper, and the other pair the lower limit of the allowance or fit for which the gauge is destined, and depending upon the possibility of the calipers being applied to the test piece either with the wider pair of measuring surfaces only, or with both pairs of measuring surfaces, or with neither of them, the test piece would be classed as "satisfactory," or "scrap," or "to be done over."

For each one of the numerous fits of a given size a special limit caliper gauge is required which is unsuitable for other fits. As a result, an extraordinary number of caliper gauges must be held available in a shop. Once it is worn, the gauge is no longer fit to be used for the fiit it originally served to test. As the calipers contain the upper and lower limits of the fit only, the turner or the grinder will have a feeling of uncertainty with regard to the adjustment of the proper working depth in an attempt, for instance, to attain the center of the range of allowance, and thereby produce pieces of work of the highest possible uniformity. With the customary limit caliper gauges, it is impossible to determine the actual size a finished piece of work has within a given range of allowance. Apart from that, the result of gauging is strongly influenced by the varying gauging pressure exerted when placing the gauge on the test piece transversely to the measuring surfaces.

These shortcomings of the existing limit caliper gauges are avoided in accordance with the present invention in such a way that the measuring surfaces contacting two points of the cylindrical test piece diametrically opposite one another, are slightly inclined one towards the other, and that the depth of penetration of the test piece between the measuring surfaces exerts an influence upon the relative change in position between a specific measuring scale and an index.

The relative inclination of the two measuring surfaces is established in such a way that the difference between their maximum and their minimum distance corresponds to the range of allowance to be established or to be measured with the caliper gauge.

Scale and index—or in place of the latter a vernier or reading table—are attached on the one hand with the caliper body, and on the other hand with an adjusting member moved to correspond to the depth of penetration of the test piece in relation to the caliper body.

Preferentially, said adjusting member consists of a casing surrounding the caliper body and leading same in the direction of the measuring surfaces, by which the caliper gauge is handled.

In order to invariably maintain a specific measuring pressure from which the depth of penetration depends, that pressure is determined exclusively by the dead weight of the caliper body. This is effected in such a way that the adjusting member or the casing with a stop is deposited upon the test piece and that the caliper body guided along by or inside of the same continues moving to a point of penetration corresponding to its own dead weight.

It will be shown that with a measuring face length of about 36 mm. an actual measure scale may be employed in which one $\mu$, i. e. a thousandth of a millimetre, of the real size of the test piece corresponds to a scale distance of about 0.6 mm. on the actual measure scale, in such a way that easily thousandths of a mm. of the actual size and fractions thereof may be determined, especially if reading is effected with the aid of an optical magnifying system.

The measuring scale may be designed in such a way that its marks are indicated on both sides of the nominal sizes with a series of figures beginning with zero, in such a way that in one direction the minus values or the lower fitting values deviating from the nominal measure, and in the other direction the plus values or upper fitting values are indicated, or the marks of the measuring scale may be provided with a single series of figures, smaller on the one side of the nominal size, and larger on the other side of the same, in such a way that any actual measure of the test piece may be determined directly.

Now the various fitting sizes may be entered on the measuring scale and characterized by coloured areas, i. e. the sizes of any individual fit, the fits of a fit series, or the sizes of the fits of a plurality of serial fits. Corresponding to a limit caliper gauge, it may be ascertained now as regards any particular fit if the test piece is "satisfactory," or "scrap," or "to be done over."

Instead of engraving the fit limits on the measuring scale by special marks, arrows, or the like, movable marks may be employed which are adjustable to suit any particular fit.

Preferentially, the scale will be adapted to a lateral face of the caliper body where sizes may be read through a window provided in the casing with the aid of a cylindric lens disposed therein.

By way of example, the drawing shows one way of executing the invention.

Fig. 1 is a partially broken front view of the caliper gauge with its casing;

Fig. 2 is a corresponding lateral view of Fig. 1, seen from the right;

Fig. 3 is a section along line III—III of Fig. 1,

Figs. 4 to 7 show different types of scales, and

Fig. 8 is a section along line VIII—VIII of Fig. 7.

The caliper body 1 (Fig. 1) consists of a stirrup shaped part 2, with two forklike legs 3 and 4, parallel to each other, each of them having a measuring plate 5, 6 rigidly attached thereto. The measuring face 7 of the measuring plate 5 extends exactly in the direction of the center plane of the caliper body while measuring face 8 of measuring plate 6 is slightly inclined in relation thereto. In this way, a wedge-shaped measuring space is created which is open to penetration by the cylindrical test piece 9 to a more or less degree depending upon its actual size.

The caliper body 1 to 4 is surrounded by a casing 11 serving as adjusting member and made of any suitable material. Particularly suitable for this purpose is an artificial product of highly stable thermoplastic composition.

In the interior of casing 11, the caliper body is disposed easily slidable in the direction of the center plane. The movement is limited by a stop 12 in the form of a screw head fastened to the caliper body, and located within a slot 13 of the casing. The walls of the slot are re-inforced by a lining of sheet metal 14. While the legs 3, 4 of the caliper body are cased in on the outer, front, and back faces by the casing, this is left open within the reach of the measuring surfaces 7, 8. In addition, in the front of the casing recesses 15 have been provided, into which the measuring plates 5, 6 may enter when the caliper body is moved within the casing. Centrally located between and above the plates 5, 6 a stop 16 is inserted in the casing and fixed to the casing by screws 17. This stop member is surrounded in its upper part by the stirrup shaped part 2 of the caliper body and in its lower part it is provided with a curvature 18 whose radius roughly corresponds to the nominal size. As may be seen from Fig. 3, curvature 18 is provided with a central recess, in such a way that only its lateral parts may be seated on the test piece.

One of the narrow lateral edge faces 19 of the caliper body is provided with a measuring scale 21 (Figs. 4 to 7), an index 22 (Fig. 1) being provided for reading. The index is a line on the inside of a parallelly disposed flat pane 23 of transparent glass or plastic inserted in an opening 24 (Fig. 2) of casing wall 11. The pane has its lateral edges beveled; it rests on projections 25 of the casing, and is retained within the casing by means of a ledge 26 and with the aid of two screws 27. Between the end faces 28 of the pane and the opposing set-off faces of the casing, sufficient play has been provided that the pane after loosening screws 27, may be slightly shifted to adjust index line 22.

On pane 23, a cylindric lens 29 has been attached, through which the fine scale 21 is magnified sufficiently for comfortable reading.

The marks of the measuring scale are either identified by a consecutive series of figures containing the nominal size, such as shown in Fig. 4 and Fig. 5, or they are identified by two series of figures such as illustrated in Fig. 6 and Fig. 7, increasing in both directions from zero. In this case, the mark 0 corresponds to the nominal size, one of the series denominating minus-deviations therefrom, the other the plus-deviations.

As mentioned before, the depth of penetration of the test piece between the measuring faces 7 and 8 is used as a measure for the diameter to be checked. Therefore, measuring scale 21 has been designed taking into consideration the inclination of measuring face 8 in such a way that its marks indicate directly the actual size of the test piece. With the measuring faces 7 and 8 of an effective length of about 36 mm., the allowance ranges for nominal sizes between 30 and 50 mm. are covered if the decrease in the distance between the measuring faces amounts to about 0.05 mm. In this case, the change by $1\mu$ of the actual size of the test piece is expressed by a distance of two marks on the scale of 0.6 mm. The actual sizes, therefore, may be read with the naked eye with an accuracy of $1\mu$. Since considerable enlargement of the scale is had through the cylindric lens 29, fractions of $1\mu$ also may be read with ease. Reading may be effected with great accuracy for the reason that measuring is effected directly by the inclined face 8 which is ground flat with precision and because no sources of error such as screws, planes, lever transmissions and the like are involved.

The measuring faces 7 and 8 may be made sufficiently long and provided with an inclination of such a nature that they may be utilized for all fits of any particular nominal size. There is no objection, however, to provide a greater inclination of the measuring face 8 for series of coarser fits in place of the one used for more exact fits. In addition, the measuring scale 21 may be extended beyond the ranges of allowance to make it possible to establish the actual sizes of test pieces also in these additional ranges.

For the purpose of carrying out a test, casing 11 is lifted with two fingers by the fluted gripping faces 31 in the upper part and brought with its plates above test piece 9. In doing so, the caliper body 1, 2, by reason of its own weight, is in its lowermost position within the casing, to begin with, its stop 12 resting on the lower wall of slot 13. If casing 31 is moved now downward, the measuring faces 7, 8 are situated above test piece 9 and are moved along downward until their respective distance in the horizontal center plane of the test piece has diminished to the size of the diameter of the test piece. While the caliper body is now being retained by the test piece, casing 11 may be moved further downward without influencing the caliper body until stop face 18 is seated on test piece 9. In this position of the parts, index 22 directly shows the actual size of the test piece, always provided, of course, that scale and index are in proper adjustment. Adjustment is effected in such a way that in placing the caliper gauge on a plug gauge of accurate nominal size, index 22 is adjusted in the above described manner by shifting pane 23. In place of the plain index mark 22, a vernier (not shown) also may be used, or the range of vision with regard to the scale may be designed in any desired and suitable way.

From what has been explained it will be evident that measuring is invariably effected under the same measuring pressure correspondng to the dead weight of the caliper body, and that it will not be affected by the casing 11 with its curvature 18 being seated on the test piece lightly or more vehemently.

The measuring scale according to Fig. 4 is used if it is a question only of determining any particular actual size of the test piece within the range of allowance or beyond the same. If the caliper gauge is to be used in the sense of a limit caliper gauge for any definite fit, such as for instance fit ISA 40g5, the admissible range of allowance 32 from 39.98 to 39.991 may be marked off by especially conspicuous lines, or the whole range may be characterized by a special color, such as white, etc. Neighbouring ranges on the scale may be colored differently. Thus, for instance, the range covering smaller actual sizes may be colored red, and the range covering larger actual sizes, blue. Thus if in testing pieces, index 22 is in the white field, the test piece is "satisfactory," if it is in the blue area it is "to be done over," and if it is in the red range, it would count as "scrap."

As shown in Fig. 6, the scale may be used at once simultaneously for a number of fits by engraving or otherwise registering in a free center or lateral field of the scale the ranges of allowance of such fits. To the extent to which the allowance ranges do not interfere with one another as is the case on one side with the fits 4j5 and m5, and h5 and n5 respectively, they may be vertically disposed one above the other. In case of overlapping one another to a certain extent, they are arranged in fields neighbouring one another. If designed in this manner, the caliper gauge may be used simultaneously for a plurality of fits of any particular nominal measure, the effective actual size being measurable directly in each particular instance.

In order to make each caliper gauge suitable for any particular size that may be required, but for that particular fit exclusively, an arrangement may be made by which the limits of allowance may be made movable and adjustable. In accordance with Fig. 7 this is effected in such a way that a dove-tail shaped groove 33 is provided in the center region of the scale within which two slides 34 may be shifted, each of them provided with a limit line 35. By tightening a grub screw 36 which is seated on the bottom of groove 33, the slides 34 may be tightened in any desired position. The upper slide has a red, and the lower one a blue upper surface. For the purpose of adjusting the particular fit, the slide is placed with its mark on the lower fit limit, and the blue slide on the upper fit limit. If designed in this way also the caliper gauge may be used as limit caliper gauge with which, simultaneously, the precise actual size may be ascertained, and the possibility to adjust the gauge, if desired, to any fit of the nominal size, offers the advantage that apart from the plain measuring scale there will be no need for any confusing engravements on the measuring scale.

One essential feature of the invention consists in that in the measuring scale the depth of penetration of the test piece between the measuring faces is expressed as the actual size of the test piece, a corresponding movement being enacted by a special adjusting member between index mark 22, and scale 21. The adjusting member through which the depth of penetration is transferred to the index, may be designed in a great many ways. In the case in hand, it has the shape of casing 11 by which not only the caliper body 1, 2 is protected towards the outside, but it has the task, simultaneously, to guide the caliper body in the direction of the measuring faces, and to make it possible that the measuring pressure under which the measuring faces 7, 8 are applied to the test piece is always unchanged, i. e., invariably corresponding to the weight of the caliper body.

The measuring scale 21 may be located at any desired point of the caliper body, even at the front or on the back. With an arrangement such as shown on one of the two narrow lateral faces, the advantage is evident that in applying the gauge on a lathe or grinding machine, the scale may be watched without any necessity for the turner or grinder to look in any other direction or change his working attitude.

What is claimed as new, is:

1. In a caliper gauge of the class described, a caliper body, two measuring faces on it adapted to contact two points of a cylindrical test piece diametrically opposite one another, said measuring faces being approximately vertical but slightly inclined towards each other, a casing surrounding the caliper body, said casing being open in the reach of the measuring faces and adapted to prevent any touch of the caliper body by the holding hand, means for guiding and moving freely the caliper body and said casing in relation to one another in the vertical direction, a measuring scale, an index cooperating therewith, one of the two latter being connected with the caliper body the other with said casing, a stop carried by said casing cooperating with the top point of the test piece, said stop being arranged in relation to the index and the measuring scale respectively so as to contact a test piece of nominal size when the index has reached the mark of nominal size of the measuring scale, and gripping means formed upon said casing for placing the two measuring faces astride of the test piece exclusively under the dead weight of the caliper body whereby the measuring scale and the index are moved relatively to each other in accordance with the depth of penetration of the test piece between the measuring faces.

2. In a caliper gauge according to claim 1, forklike legs carried by the caliper body bearing said measuring faces, lower parts of the casing embracing said forklike legs on three sides providing an open space between the measuring faces.

3. In a caliper gauge according to claim 1, forklike legs carried by the caliper body bearing said measuring faces, lower parts of the casing embracing said forklike legs on three sides providing an open space between the measuring faces, a front wall and a rear wall of the casing, said stop being secured between them at the upper end of said space.

4. In a caliper gauge according to claim 1, a narrow lateral edge face of the caliper body being parallel with one of said measuring faces and bearing said measuring scale.

5. In a caliper gauge according to claim 1, a narrow lateral edge face of the caliper body being parallel with one of the measuring faces and bearing said measuring scale, an aperture in the casing in registry with said measuring scale, a pane disposed in said aperture bearing said index.

6. In a caliper gauge according to claim 1, an aperture in said casing in registry with said measuring scale, a flat pane bearing said index arranged in said aperture and having a length in relation to the length of the aperture so as to allow corrective movement of the index and means for tightening said pane in its adjusted position.

7. In a caliper gauge according to claim 1, a narrow lateral edge face of the caliper body being parallel with one of the measuring faces and bearing said measuring scale, a dove tail groove in said scale, slides glidingly arranged in said groove, a limit line on each slide designating the limit of a fit, a grub screw in each slide adapted to tighten its slide in an adjusted position.

FRIEDRICH JAKOBI.

References Cited in the file of this patent

UNITED STATES PATENTS

| Number | Name | Date |
|---|---|---|
| 601,721 | Vine | Apr. 5, 1898 |
| 1,491,100 | Hoke | Apr. 22, 1924 |
| 2,158,925 | Braswell | May 16, 1939 |
| 2,254,812 | Aller | Sept. 2, 1941 |
| 2,307,945 | Palik | Jan. 12, 1943 |

FOREIGN PATENTS

| Number | Country | Date |
|---|---|---|
| 321,742 | Germany | June 12, 1920 |
| 376,892 | Germany | June 7, 1923 |
| 462,109 | Germany | July 4, 1928 |
| 286,154 | Great Britain | Mar. 1, 1928 |
| 594,125 | Great Britain | Nov. 4, 1947 |
| 767,684 | France | July 23, 1934 |
| 791,315 | France | Dec. 7, 1935 |
| 801,887 | France | Aug. 20, 1936 |
| 259,492 | Switzerland | June 16, 1949 |